United States Patent
Zips et al.

(10) Patent No.: US 11,366,463 B2
(45) Date of Patent: Jun. 21, 2022

(54) METHOD AND DEVICE FOR ASSESSING A CONTROL LOOP

(71) Applicant: Robert Bosch GmbH, Stuttgart (DE)

(72) Inventors: Patrik Zips, Vienna (AT); Markus Gurtner, Vienna (AT); Adrian Trachte, Stuttgart (DE); Daniel Seiler-Thull, Stuttgart (DE); Julian Ophey, Leonberg (DE); Muhammed Atak, Denkendorf (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 17/090,575

(22) Filed: Nov. 5, 2020

(65) Prior Publication Data
US 2021/0216064 A1 Jul. 15, 2021

(30) Foreign Application Priority Data
Jan. 13, 2020 (DE) .......................... 102020200314.9

(51) Int. Cl.
*G05B 23/02* (2006.01)
*G05B 19/418* (2006.01)

(52) U.S. Cl.
CPC ..... *G05B 23/0264* (2013.01); *G05B 19/4184* (2013.01); *G05B 23/0227* (2013.01); *G05B 23/0272* (2013.01)

(58) Field of Classification Search
CPC ............ G05B 23/0264; G05B 23/0227; G05B 23/2072; G05B 19/4184
See application file for complete search history.

(56) References Cited

U.S. PATENT DOCUMENTS

| 2014/0067483 | A1* | 3/2014 | Jeong | G06Q 10/06393 705/7.39 |
| 2016/0353985 | A1* | 12/2016 | Haddadi | A61B 5/0022 |
| 2019/0011899 | A1* | 1/2019 | Vartak | G05B 23/0216 |

FOREIGN PATENT DOCUMENTS

| DE | 102007050026 A1 | 4/2009 | |
| WO | WO-0062256 A1 * | 10/2000 | ......... G05B 23/0272 |

* cited by examiner

*Primary Examiner* — Manuel L Barbee
(74) *Attorney, Agent, or Firm* — Norton Rose Fulbright US LLP; Gerard Messina

(57) ABSTRACT

A method for assessing a control loop. In the method, the control loop is assigned one degree of fulfillment each with respect to at least three quality criteria. The surface area of a polygon having a geometry defined by the degrees of fulfillment is determined. An overall control quality of the control loop is evaluated on the basis of the surface area.

9 Claims, 7 Drawing Sheets

METHOD AND DEVICE FOR ASSESSING A CONTROL LOOP

CROSS REFERENCE

The present application claims the benefit under 35 U.S.C. § 119 of German Patent Application No. DE 102020200314.9 filed on Jan. 13, 2020, which is expressly incorporated herein by reference in its entirety.

FIELD

The present invention relates to a method for assessing a control loop. In addition, the present invention relates to a corresponding device, a corresponding computer program as well as a corresponding storage medium.

BACKGROUND INFORMATION

In automatic-control and automation engineering, any self-contained action sequence for influencing a physical variable in a technical process is referred to as a control loop. To that end, the instantaneous or actual value of the variable is fed back to a controller which, by way of a negative feedback, counteracts any deviation from the targeted or setpoint value.

In this context, among the tasks of the controller is to specify the time response of the controlled variable in terms of the static and dynamic behavior according to predetermined requirements. In order to also satisfy contradictory demands—for instance, with respect to response to setpoint changes and response to disturbances—more costly control-loop structures are often necessary. The quality of such controllers is of great importance since, for example, inadequately controlled industrial processes harbor a considerable safety risk in the event the controlled variable deviates excessively.

As is conventional, different quality criteria exhibit a somewhat opposite behavior in response to a change in individual control parameters. For example, if the closed-loop gain is increased, the rise time shortens; on the other hand, the settling time and the overshoot amplitude increase. The design of a generic control loop and its optimization in terms of response to setpoint changes, response to disturbances and robust behavior therefore represents a special challenge.

German Patent Application No. DE 102007050026 A1 describes a method for monitoring a control loop in a system, particularly in a motor system in a motor vehicle. The method provides for determining a characteristic number from a default value and a system variable of the control loop during one or more changes of state, and ascertaining a fault as a function of the characteristic number determined.

SUMMARY

The present invention provides a method for assessing a control loop, a corresponding device, a corresponding computer program as well as a corresponding machine-readable storage medium.

The method according to an example embodiment of the present invention is based on the knowledge that performance and quality of closed control loops are evaluated, inter alia, against criteria which relate to their control quality (performance). In this context, particular indices or indicators (control performance indicators, CPIs) may be very contrary to each other. Noise suppression and dynamic response behavior may be mentioned as examples for such highly contrary indicators. Although the technical literature proposes numerous CPIs, there is no systematic combination and layout of the individual evaluations, in order to permit a reliable assessment of the overall control quality.

Against this background, an example embodiment of the present invention involves the purposeful geometric combination of a plurality of performance or quality criteria.

One advantage of this design approach lies in the possibility opened up for a systematic combination of a wide variety of performance criteria for closed control loops. The most important—to some extent contrary—quality criteria for closed control loops are thereby considered systematically. Their efficient combination provides the possibility of a meaningful evaluation of the overall control quality. This comprehensive consideration offers indisputable advantages compared to an individual consideration of specific CPIs.

Advantageous further developments of and improvements to the present invention are made possible by the measures described herein. Thus, a combination of the calculatory evaluation together with a suitable form of display may be provided, which illustrates the overall performance, so that it may be interpreted intuitively. Because the user is enabled in this way to make a decision with respect to the adequacy of a particular controller, the functional reliability of the control loop is increased substantially.

In this way, an evaluation of the closed control loop is also made possible via various simulation scenarios or test configurations on a prototype—for instance, with respect to performance in the worst case or on average. In addition, the sensitivity of individual criteria relative to the test scenarios may be determined by calculating the gradients in boundary regions of the performance chart. By high coverage of the possible test scenarios and configurations, it is possible to obtain reliable information concerning the overall performance of the closed control loop.

According to a further aspect of the present invention, the design of the closed control loop may be gathered from the length and direction of a centroid vector. Thus, for example, current regulators should have good dynamic behavior and thus a centroid in the dynamic range, while positioning control systems with high demands for steady-state accuracy should have a centroid in the steady-state range.

According to a further aspect of the present invention, special CPIs may be defined and used which supply reliable results in application scenarios as general as possible.

BRIEF DESCRIPTION OF THE DRAWINGS

Exemplary embodiments of the present invention are represented in the figures and explained in greater detail below.

DETAILED DESCRIPTION OF EXAMPLE EMBODIMENTS

Figure 1:
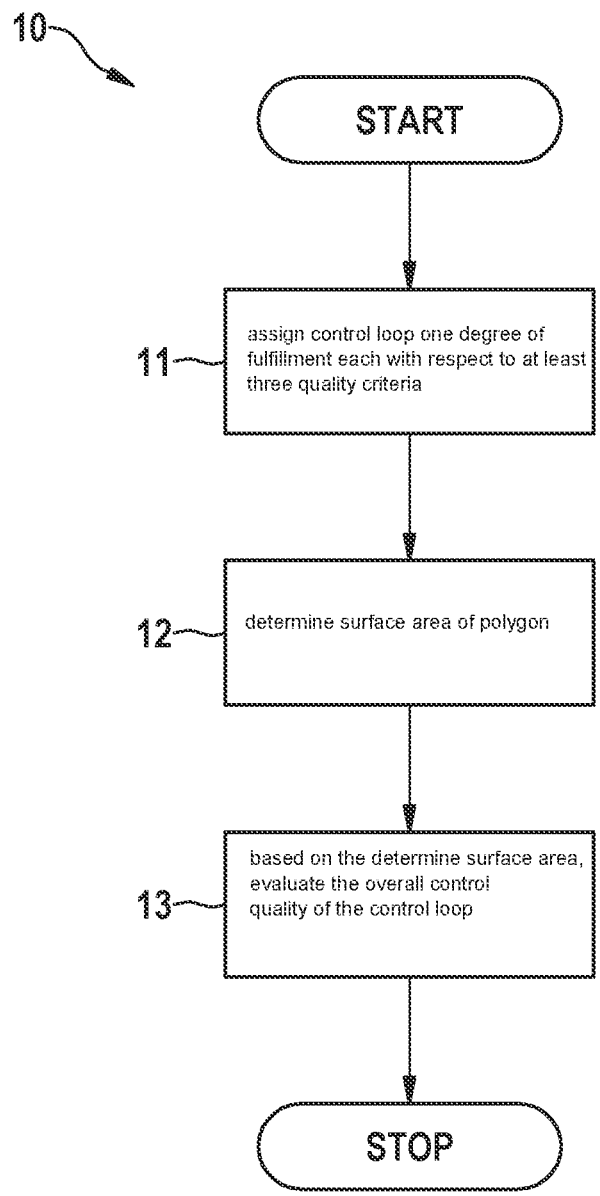
FIG. 1 shows a flowchart of a method according to a first specific embodiment of the present invention.

FIG. 1 illustrates the basic steps of a method (10) for assessing a control loop. In this case, the control loop is assigned one degree of fulfillment each with respect to at least three quality criteria (process 11). For the purpose of the further description, six criteria are utilized by way of example, it being explicitly emphasized that a higher number of criteria is also possible.

As a first quality criterion ($CPI_1$), an oscillation index is generated which evaluates the signal power of the oscillating components against the original signal characteristic. Since oscillations have a negative effect on the performance of a system and in addition, serve as indicators for instabilities, their detection and evaluation is especially important.

As second quality criterion ($CPI_2$), the dynamic response behavior may be considered by use of the time derivatives of setpoint variable $\dot{r}$ and controlled variable $\dot{y}$. In control loops with excellent following behavior, the relationship $\dot{r} \approx \dot{y}$ is true. For the local response deviation, the measure $$RD = \frac{\dot{y}}{\dot{r}} - 1 \qquad \text{Formula 1}$$

is thus suitable and its absolute mean value $\text{mean}(|RD|)$ in the dynamic range ($\dot{r} \neq 0$).

As a third quality criterion ($CPI_3$) likewise pertaining to the dynamic response behavior, the sequential error is considered.

The underlying measure is the percentile $p_{99}(|e_{dyn}|)$ of the control error $e = y - r$, which is evaluated in the dynamic range. This indicator describes that limit which the dynamic control error does not exceed over a time proportion of 99%.

The remaining steady-state control deviation is essential for many closed control loops, and is therefore a suitable fourth quality criterion ($CPI_4$). Specifically, the average value of the control deviation in the steady-state range $\text{mean}(e_\infty)$ is utilized as assessment criterion. In the ideal case, it always lies at zero.

For constant control quality, a pure evaluation of the average control error is sometimes insufficient. In addition to this, the variance of the controlled variable $\text{Var}(y)$ is a useful fifth quality criterion ($CPI_5$) for evaluating the steady-state accuracy and the ability of the closed control loop to stabilize a steady-state operating point. Assuming a normally distributed output variable (at least in the steady-state operating point), the relationship $$\sigma_y^2 = \text{Var}(y) \qquad \text{Formula 2}$$

applies for the associated standard deviation, by which, namely, a traceable default of the required variance is made possible.

As a related aspect for evaluating the variance, the noise suppression comes into consideration as a sixth quality criterion ($CPI_6$). Quantification of the propagation of the noise power in the closed control loop is thereby possible based on a dynamic error budgeting. Since noise signals n are mean-free, the noise power $$\text{Var}(n) = RMS(n)^2. \qquad \text{Formula 3}$$

is obtained. Because of the statistical independence between measurement noise n and the noise component of setpoint variable r, from this follows the noise gain $$NR = \frac{\text{Var}(y)}{\text{Var}(n) + \text{Var}(r)}. \qquad \text{Formula 4}$$

Figure 2:
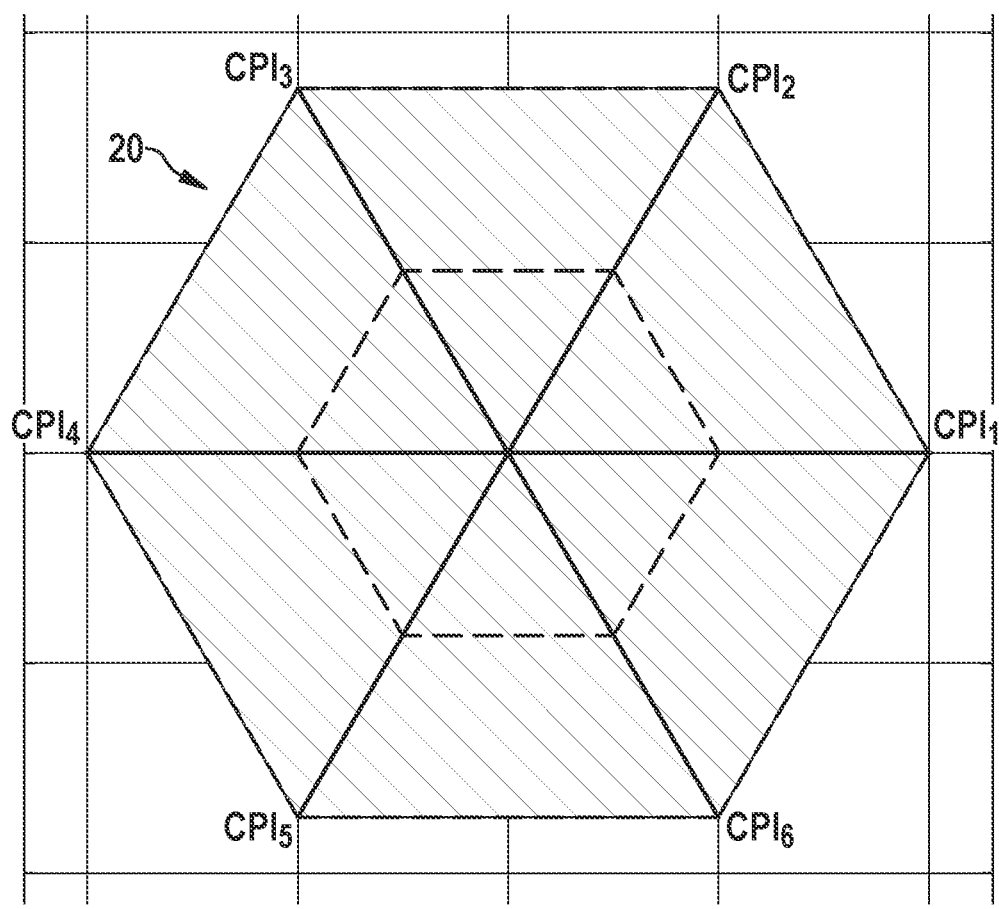
FIG. 2 shows a schematic diagram for the projection of six performance criteria into the two-dimensional plane.

These six quality criteria ($CPI_1$, $CPI_2$, $CPI_3$, $CPI_4$, $CPI_5$, $CPI_6$) are projected geometrically in the form of a simple regular polygon (20) onto the two-dimensional plane (FIG. 2). Preferably, the criteria are disposed in this polygon in such a way that similar aspects flow into adjacent criteria, and contrary evaluations have as great a distance from each other as possible. In this context, for each criterion, the origin of the coordinate system represents the lowest possible evaluation, while the maximum distance on the respective ray represents the highest possible evaluation. Thus, the number of vertices and rays—in the present case six—always corresponds to the number of quality criteria considered.

Figure 3:
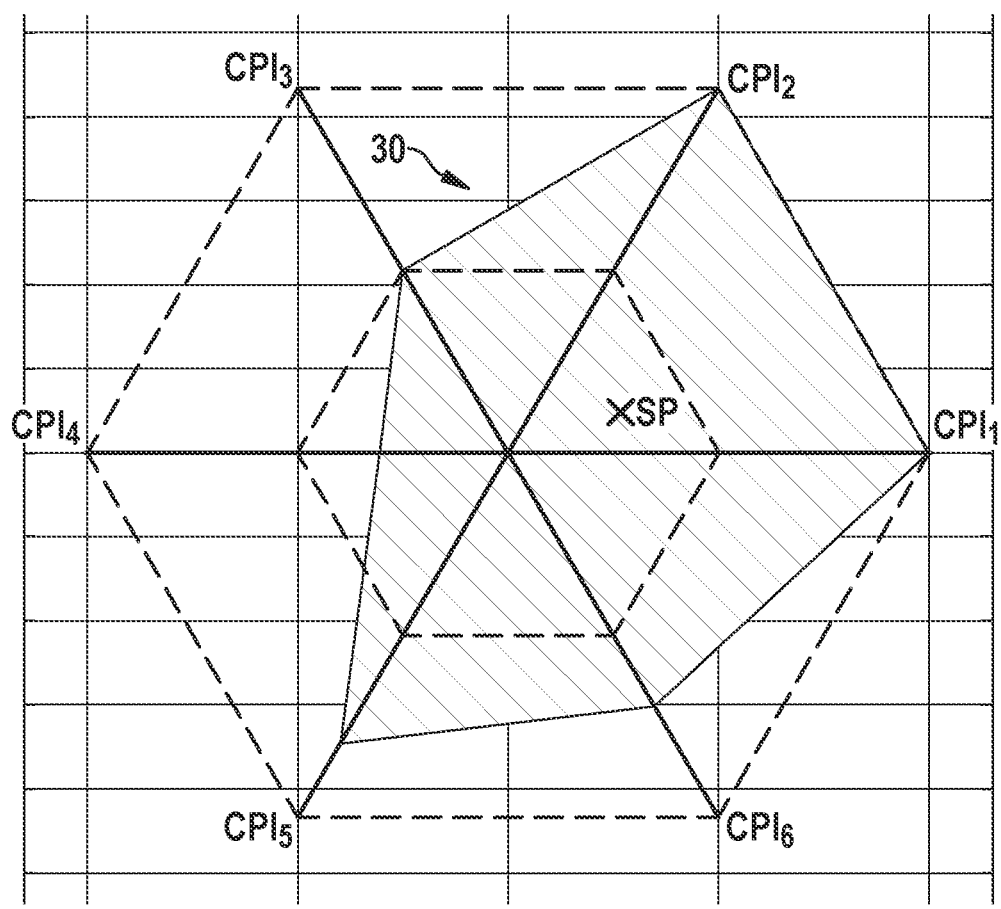
FIG. 3 shows an exemplary polygon for the degrees of fulfillment of 100%, 100%, 50%, 30%, 80% und 70%.

To clarify the interpretation of this polygon, reference is made to FIG. 3. In the example shown, quality criteria ($CPI_1$, $CPI_2$, $CPI_3$, $CPI_4$, $CPI_5$, $CPI_6$) were assigned degrees of fulfillment of 100%, 100%, 50%, 30%, 80% and 70%, respectively. It may be inferred intuitively from the figure that the evaluated closed control loop in the selected scenario exhibits an excellent performance with respect to criteria $CPI_1$ and $CPI_2$, as well as a good performance in terms of $CPI_5$ und $CPI_6$. The grading of $CPI_4$ may indicate an inadequate performance, that of $CPI_3$, a still acceptable performance.

Essential overall assessment criteria may be derived and interpreted on the basis of the form of display selected. To that end, the surface area of polygon (30) is determined (process 12—FIG. 1) and based on it, the overall control quality of the control loop is evaluated (process 13). The maximum achievable total surface area (compare FIG. 2) may thus be considered as reference of an optimal control quality.

Further information with respect to the performance of the overall system is furnished by the centroid vector (SP—FIG. 3). Its magnitude represents a measure for the uniformity of the performance distribution to the individual criteria. The azimuthal position of the centroid vector points ultimately to that criterion which makes the greatest contribution to the overall performance. The performance of the closed control loop is obtained directly through the purposeful placement of similar CPIs.

Figure 4:
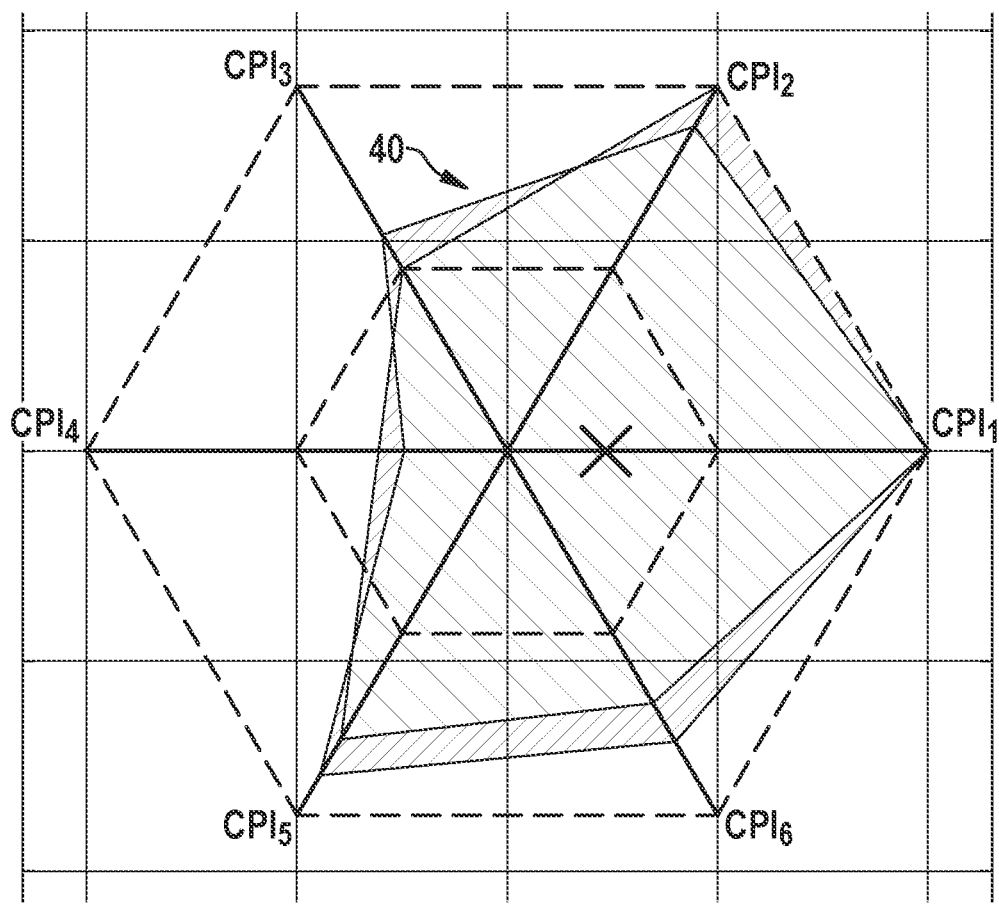
FIG. 4 shows a corresponding representation for two data sets.
Figure 5:
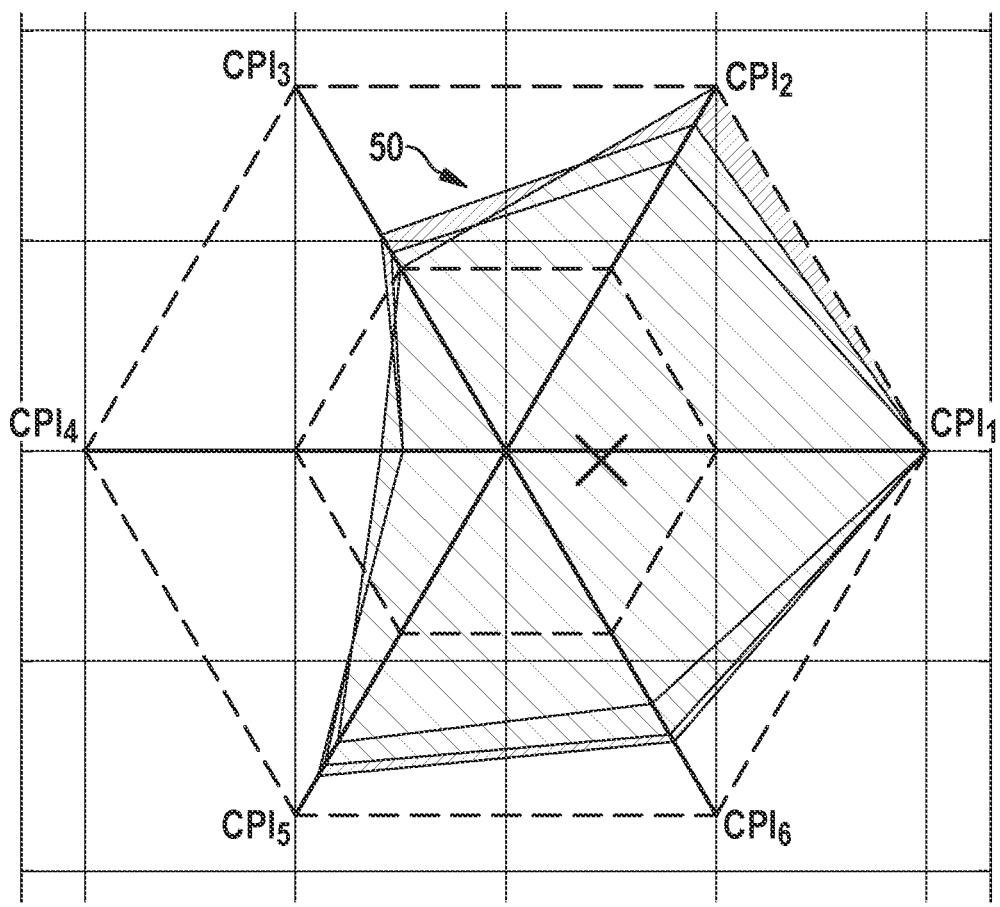
FIG. 5 shows a corresponding representation for three data sets.
Figure 6:
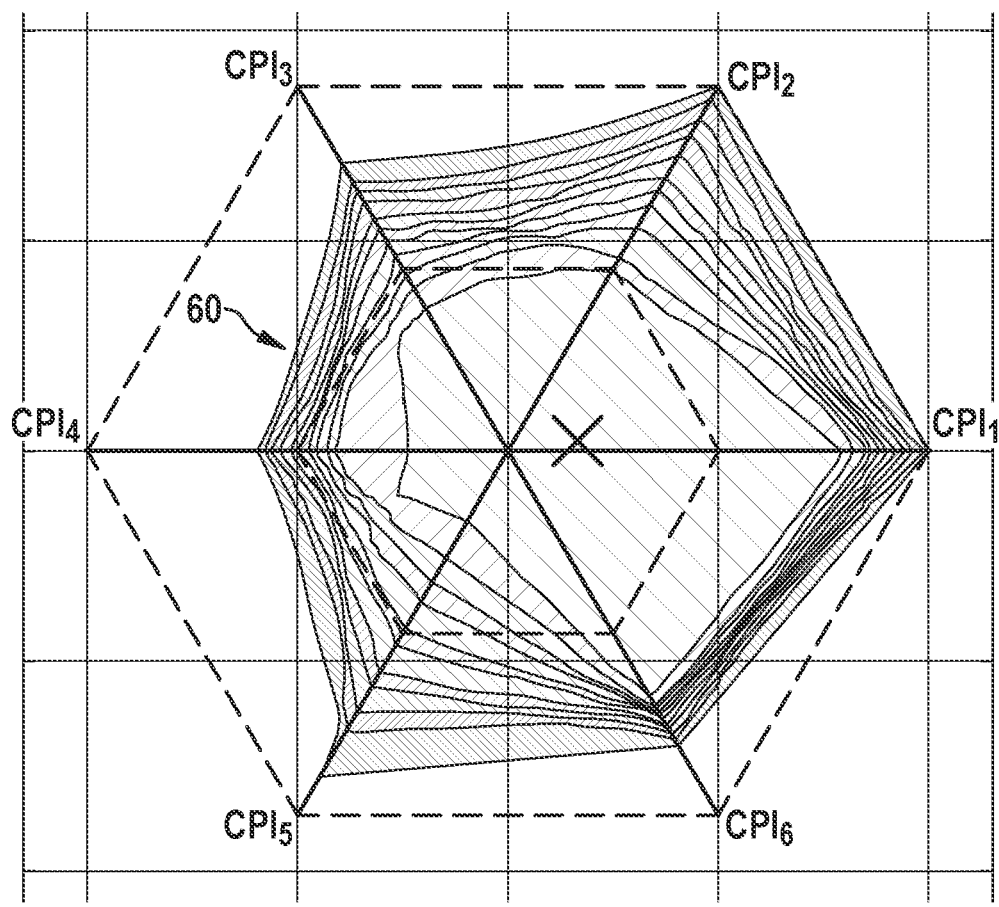
FIG. 6 shows a corresponding representation for 100 data sets.

Corresponding polygons (40, 50, 60) for two, three and 100 test scenarios are shown in FIGS. 4, 5 and 6. If, as in these cases, several data sets are available, then in evaluating them, it is determined which performance ranges are covered how often. In order to promote an intuitive and meaningful interpretation of the entirety of the performance criteria, the total coverage of the respective ranges may be color-coded. This color coding may be backed up by level curves. A color progression from green (degree of fulfillment attained in each data set) through orange (attained in 50 of the data sets) to red (attained at least once) come into consideration as possible color code.

Upon close examination of FIG. 5, the advantages of this assessment method already become apparent. First of all, it may be gathered that the degree of fulfillment of $CPI_1$ matches in the selected data sets. Secondly, it becomes apparent that the degree of fulfillment of $CPI_2$ varies the most between the data sets.

As FIG. 6 demonstrates, according to the present invention, the overall performance of a closed control loop may be assessed and displayed clearly and intuitively for a high number of data sets, as well. Especially for checking technical specifications, it is of highest relevance to be able to indicate the minimum quality which is met in each data set evaluated. Furthermore, the gradient of the superimposed polygons might be used as a measure for the sensitivity of the individual performance criteria relative to the test scenarios. For instance, the level curves closely adjoining along the corresponding rays in FIG. 6 illustrate that $CPI_1$ and $CPI_6$ have high agreement between the various data sets (high gradient). In contrast, $CPI_2$ and $CPI_5$ vary over a substantially larger area (low gradient).

Figure 7:
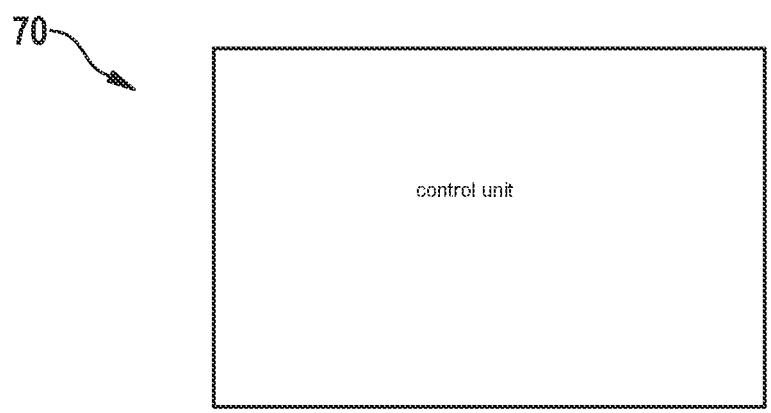
FIG. 7 schematically, a control unit according to a second specific embodiment of the present invention.

For example, this method (10) may be implemented in software or hardware or in a mixed form of software and hardware, e.g., in a control unit 70, as the schematic representation of FIG. 7 illustrates.

Example embodiments of the present invention are further described in the following paragraphs.

Paragraph 1. A method (10) for assessing a control loop, characterized by the following features:
the control loop is assigned (11) one degree of fulfillment each with respect to at least three quality criteria ($CPI_1$, $CPI_2$, $CPI_3$, $CPI_4$, $CPI_5$, $CPI_6$),
the surface area of a polygon (20, 30, 40, 50, 60) having a geometry defined by the degrees of fulfillment is determined (12), and
an overall control quality of the control loop is evaluated (13) on the basis of the surface area.

Paragraph 2. The method (10) as recited in Paragraph 1, characterized by at least one of the following features:
the quality criteria ($CPI_1$, $CPI_2$, $CPI_3$, $CPI_4$, $CPI_5$, $CPI_6$) relate to oscillations of a controlled variable of the control loop ($CPI_1$),
the quality criteria ($CPI_1$, $CPI_2$, $CPI_3$, $CPI_4$, $CPI_5$, $CPI_6$) relate to a dynamic response behavior of the control loop ($CPI_2$),
the quality criteria ($CPI_1$, $CPI_2$, $CPI_3$, $CPI_4$, $CPI_5$, $CPI_6$) relate to a dynamic control error of the control loop ($CPI_3$),
the quality criteria ($CPI_1$, $CPI_2$, $CPI_3$, $CPI_4$, $CPI_5$, $CPI_6$) relate to a remaining steady-state control deviation of the control loop ($CPI_4$),
the quality criteria ($CPI_1$, $CPI_2$, $CPI_3$, $CPI_4$, $CPI_5$, $CPI_6$) relate to a variance of the controlled variable in a steady-state operating point ($CPI_5$) or
the quality criteria ($CPI_1$, $CPI_2$, $CPI_3$, $CPI_4$, $CPI_5$, $CPI_6$) relate to a noise suppression attained by the control loop ($CPI_6$).

Paragraph 3. The method (10) as recited in Paragraph 1 or 2, characterized by the following feature:
the polygon (20, 30, 40, 50, 60) is displayed graphically.

Paragraph 4. The method (10) as recited in one of Paragraphs 1 through 3, characterized by one of the following features:
a geometric centroid (SP) of the polygon (20, 30, 40, 50, 60) is determined and
a design of the control loop is deduced on the basis of the centroid (SP).

Paragraph 5. The method as recited in one of Paragraphs 1 through 4, characterized by one of the following features:
a process regarding vehicle engineering is controlled with the aid of the control loop or
a manufacturing process is controlled with the aid of the control loop.

Paragraph 6. The method (10) as recited in one of Paragraphs 1 through 5, characterized by the following features:
if the overall control quality drops below a predetermined threshold, then parameters of the control loop are readjusted or
if the overall control quality drops below a predetermined threshold, then the controller is rejected.

Paragraph 7. The method (10) as recited in one of Paragraphs 1 through 6, characterized by the following feature:
the threshold is predetermined in such a way that it corresponds to 50 of the largest possible surface area.

Paragraph 8. A computer program which is equipped to carry out the method (10) according to one of Paragraphs 1 through 7.

Paragraph 9. A machine-readable storage medium on which the computer program according to Paragraph 8 is stored.

Paragraph 10. A device (70) which is equipped to carry out the method (10) according to one of Paragraphs 1 through 7.

What is claimed is:

1. A method for assessing a control loop, comprising the following steps:
assigning the control loop one degree of fulfillment each with respect to at least three quality criteria;
determining a surface area of a polygon having a geometry defined by the degrees of fulfillment; and
evaluating an overall control quality of the control loop based on the determined surface area.

2. The method as recited in claim 1, wherein:
the quality criteria relate to oscillations of a controlled variable of the control loop, or
the quality criteria relate to a dynamic response behavior of the control loop, or
the quality criteria relate to a dynamic control error of the control loop, or
the quality criteria relate to a remaining steady-state control deviation of the control loop, or
the quality criteria relate to a variance of the controlled variable in a steady-state operating point, or
the quality criteria relate to a noise suppression attained by the control loop.

3. The method as recited in claim 1, further comprising the following step:
displaying the polygon graphically.

4. The method as recited in claim 1, further comprising the following steps:
determining a geometric centroid of the polygon; and
deducing a design of the control loop based on the determined geometric centroid.

5. The method as recited in claim 1, further comprising:
controlling a process regarding vehicle engineering using the control loop; or
controlling a manufacturing process using the control loop.

6. The method as recited in claim 1, further comprising:
readjusting parameters of the control loop when the overall control quality drops below a predetermined threshold; or
rejecting the controller when the overall control quality drops below the predetermined threshold.

7. The method as recited in claim 6, wherein the threshold is predetermined in such a way that it corresponds to 50% of a largest possible surface area.

8. A non-transitory machine-readable storage medium on which is stored a computer program for assessing a control loop, the computer program, when executed by a computer, causing the computer to perform the following steps:
    assigning the control loop one degree of fulfillment each with respect to at least three quality criteria;
    determining a surface area of a polygon having a geometry defined by the degrees of fulfillment; and
    evaluating an overall control quality of the control loop based on the determined surface area.

9. A device configured to assess a control loop, the device configured to:
    assign the control loop one degree of fulfillment each with respect to at least three quality criteria;
    determine a surface area of a polygon having a geometry defined by the degrees of fulfillment; and
    evaluate an overall control quality of the control loop based on the determined surface area.

\* \* \* \* \*